United States Patent [19]
Sato et al.

[11] Patent Number: 4,815,127
[45] Date of Patent: Mar. 21, 1989

[54] COMMUNICATION SYSTEM USING UNBALANCED COMMUNICATION PATHS

[75] Inventors: Yasuji Sato; Yoshihiro Akita, both of Tokyo, Japan

[73] Assignee: Kabushiki Kaisha Toshiba, Kanagawa, Japan

[21] Appl. No.: 114,198

[22] Filed: Oct. 29, 1987

[30] Foreign Application Priority Data

Mar. 24, 1987 [JP]  Japan .................................. 62-67817

[51] Int. Cl.$^4$ ............................................... H04J 1/12
[52] U.S. Cl. ......................................... 379/417; 370/6
[58] Field of Search ............... 379/417, 414, 415, 416; 370/6

[56] References Cited

U.S. PATENT DOCUMENTS 2,233,473  3/1941  Dixon ........................................ 370/6

FOREIGN PATENT DOCUMENTS 2498852  7/1982  France ..................................... 370/6

Primary Examiner—Eugene R. LaRoche
Assistant Examiner—David Mis
Attorney, Agent, or Firm—Banner, Birch, McKie & Beckett

[57] ABSTRACT

A signal communication apparatus is used for a telephone system having a plurality of unbalanced communication paths. A feedback line of each unbalanced communication path is connected to a ground level and each unbalanced communication path including a phase reversing transformer. The phase reversing transformer produces two induced currents in the connected path if a speech signal is transmitted through another path. The induced currents are cancelled due to mutual interference.

6 Claims, 5 Drawing Sheets

COMMUNICATION SYSTEM USING UNBALANCED COMMUNICATION PATHS

BACKGROUND OF THE INVENTION

Field Of The Invention

This invention relates to the field of telecommunications and more particularly, is directed to a telephone communications system which uses unbalanced communication paths or lines. The system includes apparatus for attenuating crosstalk in the communication paths.

SUMMARY OF THE INVENTION

There have been rapid developments in telephone switching networks and systems in recent years. Such telephone switching systems operate to selectively connect a telephone set to a plurality of other telephone sets in the immediate area and to a plurality of telephone lines for connection to other more remote telephones. In addition, switched telephone systems are becoming more widely used to connect computer terminals, other data handling devices and the like.

The typical telephone system, whether for internal office use or for an entire metropolitan area, includes one or more telephone exchanges to which a plurality of telephone sets are connected. Each telephone call between telephone sets is routed through at least one telephone exchange which actually connects the telephone lines of the calling telephone to the lines of the called telephone.

In conventional telephone exchanges, the switching circuits which connect the various telephone lines to complete a telephone call are often known in the prior art as cross-point switches. The cross-point switches may be formed of mechanical elements with moving parts, which are well known in the prior art. However, the trend today is toward solid state cross-point switches. C-MOS type semiconductor devices are becoming more popular than cross-point switches due to their low power consumption.

The conventional telephone exchange also includes a plurality of unbalanced communication paths which are connected together by cross-point switches. Each unbalanced communication path has two communication lines, one of which is connected to a common reference voltage level such as ground level as shown in FIG. 1. In an unbalanced communication path, it is not necessary to arrange a cross-point switch in the line connected to the common reference voltage level. Thus, the number of cross-point switches is reduced. A reduction in the number of cross-point switches results in an exchange which is lower in cost to manufacture and more compact in size.

FIG. 2 illustrates a conventional telephone exchange. A signal from office line L is supplied to main unit 1 which includes office line interface circuit 10. The signal from office line L is separated into an office line current (DC) and a voice signal by separation circuit 10A. The separated office line current is fed back to office line L as indicated by dashed line 10C. The voice signal, however, is supplied to cross-point switch 11 via transformer 10B. As FIG. 1 shows, one end of the secondary winding of transformer 10B is connected to ground level and the other end of the winding is connected to cross-point switch 11. The voice signal is supplied through cross-point switch 11 to receiver 23 via transformer 3, voice transmission line $1_1$, transformer 21 and sidetone preventing circuit 22. Since one end of the primary winding of transformer is connected to ground level and the other end of the winding is connected to cross-point switch 11, the speech path is an unbalanced communication path.

A voice signal from transmitter (mouth piece) 24 of key telephone set 2 is sent to office line L via sidetone preventing circuit 22, transformer 21, voice transmission line $1_1$, transformer 3, cross-point switch 11 and transformer 10B.

Controller 4 of main unit 1 and controller 27 of key telephone set 2 are interconnected through parallel/serial connector 5, transformer 6, data transmission line $1_2$, transformer 25 and parallel/serial converter 26 for bidirectionally exchanging control information such as dial data, calling origination data, incoming telephone call data, etc. Controller 4 controls the operation of main unit 1. For example, controller 4 controls cross-point switch 11 to selectively connect telephone set 2 to a plurality of other telephone sets and a plurality of office telephone lines in response to incoming telephone calls and calls originating from telephone set 2. Controller 27 controls the operation of telephone set 2.

The electrical power for operating telephone set 2 is supplied from transformers 3 and 6.

Thus, the unbalanced communication path illustrated in Figures 1 and 2 has the advantage of a minimum number of cross-point switches and such a communication path is prone to crosstalk. Crosstalk occurs due to the undesirable coupling of energy in one signal path to an adjacent signal path.

FIG. 3 illustrates the phenomenon of crosstalk. If a signal a' is sent from a signal source EA to a load (receiver) through unbalanced communication path A, an induced current b' related to siganl a' is produced in the unbalanced communication path B. Thus crosstalk is produced in communication path B by reason of the induced current b'. The longer the lengths of the unbalanced communication paths or the smaller the separation between them, the more crosstalk will be produced. Therefore, speech quality in an unbalanced communication path is greatly limited by crosstalk.

SUMMARY OF THE INVENTION

It is, therefore, an objective of the present invention to provide a communication system which uses unbalanced communication paths wherein crosstalk between adjacent communication paths is substantially eliminated.

It is a further objective of the present invention to provide a communication system which uses unbalanced communication paths to carry high quality speech signals.

It is still a further objective of the present invention to provide an unbalanced communication system which is relatively immune to crosstalk and stray signals induced in adjacent signal lines.

It is another objective of the present invention to provide an unbalanced communication system which is capable of carrying high quality speech signals which is relatively low in cost and more compact in size than such systems known in the prior art.

The above objectives are achieved in accordance with the present invention by providing a signal communication apparatus which includes at least one phase reversing transformer. The phase reversing transformer results in any signals induced into adjacent communication paths to be partially out of phase in order to achieve a cancelling effect. Thus, any induced signals are automatically substantially cancelled.

The signal communication system of applicants' invention is described herein in the context of a telephone system having at least one exchange coupled to at least one office line and a plurality of telephone sets coupled to the exchange. The communication paths between the telephone sets and the office lines include unbalanced communication paths. A feedback line of each unbalanced communication path is connected to a common voltage level such as ground potential. The phase reversing transformer is connected in one of the unbalanced communication paths in such a manner as to produce two induced currents, each of which is out of phase with the other by 180° and are of approximately the same amplitude. Thus, the two currents cancel each other out. Accordingly, the detrimental effects of induced current are greatly reduced, thus permitting the system to carry high quality signals without a loss of fidelity.

BRIEF DESCRIPTION OF THE DRAWINGS

The subject matter which is regarded as the present invention is particularly pointed out and distinctly set forth in the claims following the specification. The invention, however, both as to organization and method of practice, together with further objects and advantages thereof, may be best understood by reference to the following detailed description of the invention taken in conjunction with the drawings in which:

DESCRIPTION OF THE PREFERRED EMBODIMENT

Figure 1:
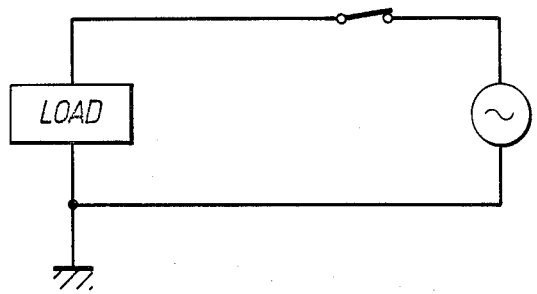
FIG. 1 illustrates an equivalent circuit for an unbalanced communication path.
Figure 2:
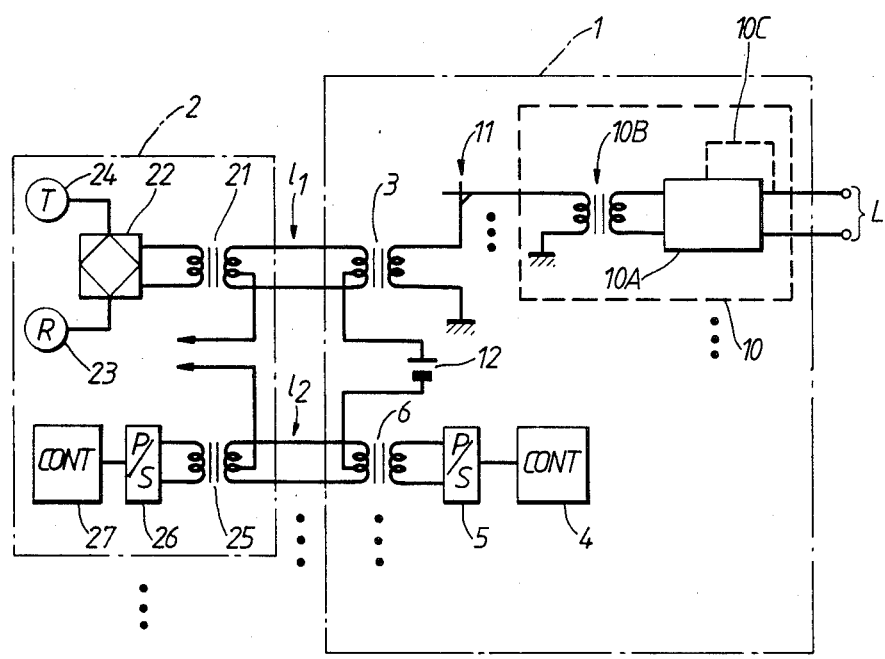
FIG. 2 is a schematic diagram of a conventional telephone system in block diagram form.
Figure 3:
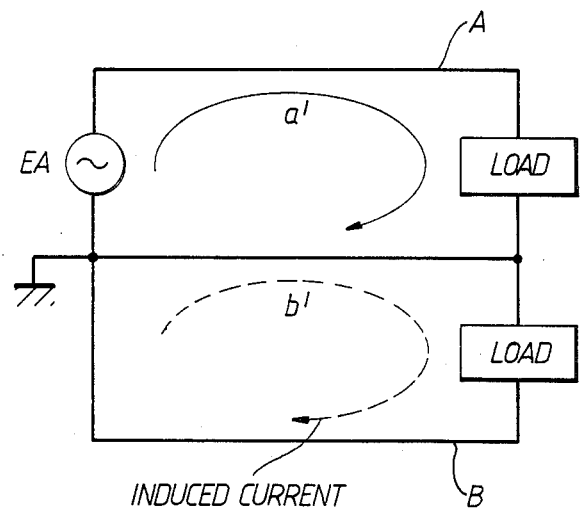
FIG. 3 illustrates the phenomenon of crosstalk in unbalanced communication paths.
Figure 4:
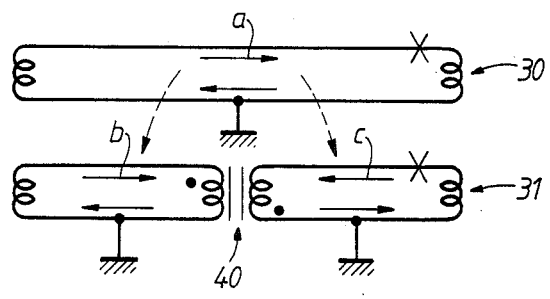
FIG. 4 illustrates a first embodiment of the present invention showing a pair of unbalanced communication paths with a phase reversing transformer connected in one of the paths.

FIG. 4 illustrates a first embodiment of the present invention. This Figure shows unbalanced communication paths 30 and 31 which correspond to the speech paths between transformers 3 and 10B shown in FIG. 2. In FIG. 4, the symbol "X" indicates a cross-point switch. The feedback lines of unbalanced communication paths 30 and 31 are connected to ground level. Unbalanced communication path 31 includes phase reversing transformer 40 connected near the center of the communication path. If a signal current flows in unbalanced communication path 30 when the cross-point switch is closed, currents b and c are induced in unbalanced communication path 31 as shown in FIG. 4. Since phase reversing transformer 40 is connected near the middle of unbalanced communication path 31, the magnitudes of induced currents b and c are nearly the same. In addition, the primary and secondary windings of transformer 40 are wound in opposite directions so that the induced currents b and c are 180° out of phase with respect to each other.

Figure 5:
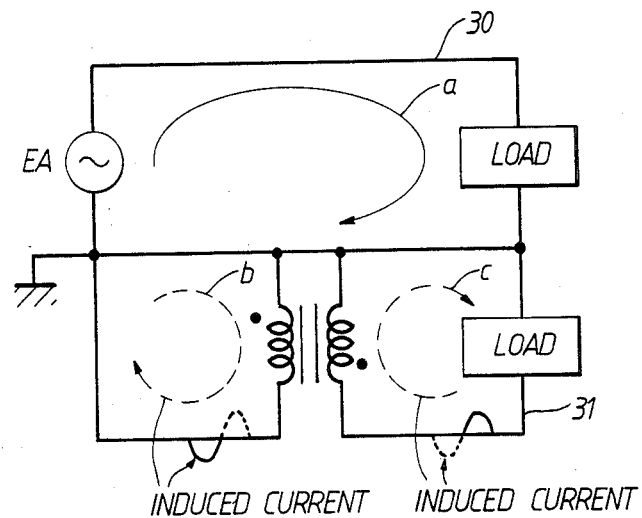
FIG. 5 illustrates the phenomenon of crosstalk in the first embodiment of the present invention shown in FIG. 4.

FIG. 5 illustrates the significant decrease in crosstalk which results from practice of the present invention as exemplified in the embodiment shown in FIG. 4. If a signal current a is supplied to the load through unbalanced communication path 30, induced currents b and c are produced in unbalanced communication path 31. As illustrated, the induced currents are 180° out of phase and are approximately of the same magnitude due to the presence of transformer 40. Thus, the currents tend to cancel each other out. Therefore, good speech quality is obtained with little or no crosstalk.

Figure 6:
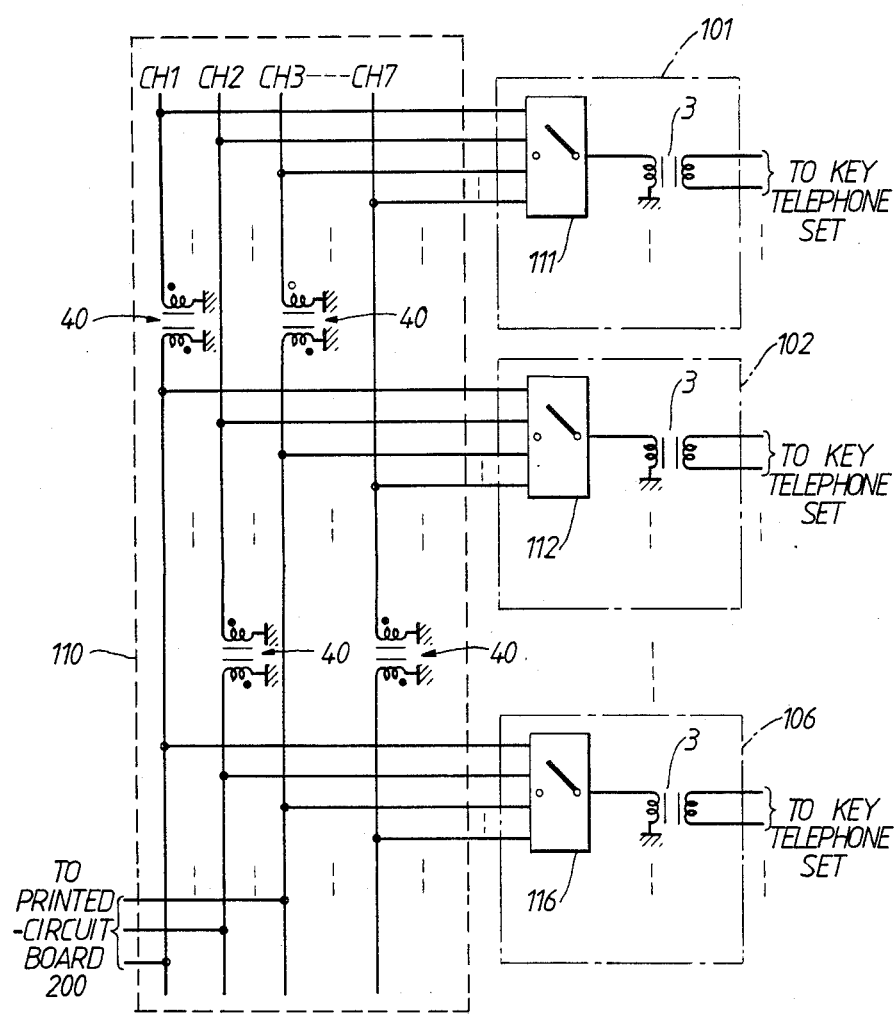
FIG. 6 illustrates a second embodiment of the present invention showing a plurality of communication paths and phase reversing transformers connected in corresponding paths.

FIG. 6 illustrates a second embodiment of the present invention. In this embodiment, a plurality of plug-in printed circuit boards 101-106 are provided each of which contains a plurality of phase reversing transformer 3 and a plurality of cross-point switches 111. For purposes of simplification, FIG. 6 shows only one phase reversing transformers 3 and one cross-point switch 111 for each printed circuit board 101-106. Also note that although FIG. 6 shows only three printed circuit boards, additional numbers are not excluded.

As shown in FIG. 6, a plurality of speech paths CH1-CH7 are formed on a printed circuit mother board (back board) 110. Speech paths CH1-CH7 may thus be formed of printed circuit traces. A plurality of phase reversing transformers 40 are connected to corresponding speech paths in a manner such that adjacent phase reversing transformers are spaced apart by an intervening speech space as shown in FIG. 6.

Figure 7:
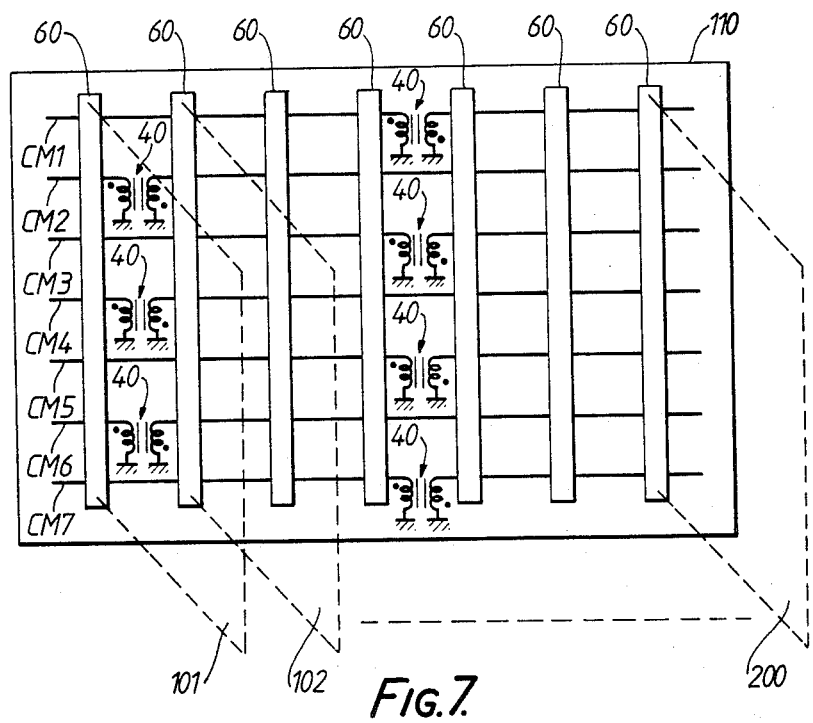
FIG. 7 is a structural view of the second embodiment of the present invention shown in FIG. 6.

Office line interface circuits are coupled to the office lines and are connected to some speech paths. The office line interface circuits are mounted on a separated printed circuit board 200 as shown in FIG. 7. FIG. 7 shows a structural view of the embodiment shown in FIG. 6. Printed circuit board connectors 60 are mounted on mother board 110 and receive circuit boards 200 and 101-106 to thereby connect the circuitry on these boards to speech paths CH1-CH7 on mother board 110. As shown in FIG. 7, phase reversing transformers 40 are mounted between first and second connectors 60 and connected in even speech paths CH2, CH4 and CH6. Phase reversing transformers 40 are also mounted between fourth and fifth connectors 60 in odd speech paths CH1, CH3, CH5 and CH7. Since phase reversing transformers 40 are mounted only on mother board 110 in this embodiment, it is not necessary to provide phase reversing transformers on a large number of other printed circuit boards 200, 101-106. Therefore, this embodiment of the present invention results in lower cost and a more compact system than known in the prior art.

Figure 8:
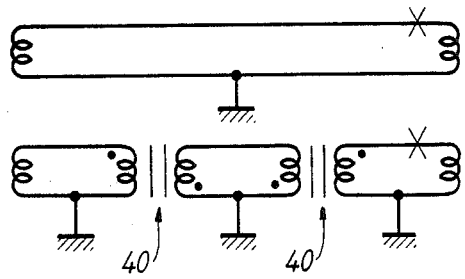
FIGS. 8 and 9 illustrate other embodiments of the present invention showing various combinations of communication paths and phase reversing transformers.
Figure 9:
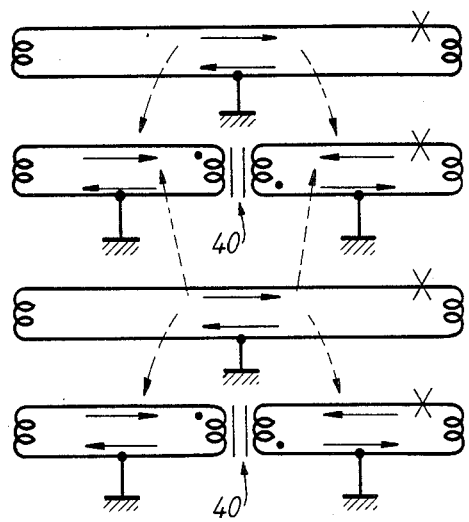

In the preferred embodiments, each unbalanced communication path has one phase reversing transformer. However, a plurality of the phase reversing transformers may be connected in the same unbalanced communication path as shown in FIG. 8. Further, phase reversing transformers 40 may be connected in each unbalanced communication path as shown in FIG. 9.

While the present invention has been described herein by reference to the preferred embodiment, various modifications can be made without departing from the true scope and spirit of the invention. It is our intention, thereof, by the appended claims, to embody all such modifications.

We claim:

1. A signal communication apparatus for transmitting a signal from a signal source to a receiver, said apparatus comprising:
   a plurality of unbalanced communication paths each having a feedback line to transmit said signals, said feedback line being connected to a common voltage level; and
   phase reversing means coupled to one of said unbalanced communication paths for producing first and second induced currents in a first of said unbalanced communication paths by the influence of a signal transmitted through a second of said unbalanced communication paths, wherein said induced currents are 180° out of phase with respect to each other, wherein said phase reversing means is connected in each unbalanced communication path.

2. The apparatus of claim 1 wherein said phase reversing means is connected in different positions with respect to adjacent unbalanced communication paths.

3. The apparatus of claim 2 wherein said phase reversing means is connected in a position corresponding to every unbalanced communication path.

4. The apparatus of claim 2 wherein a plurality of said phase reversing means are connected in the same unbalanced communication path.

5. A signal communication apparatus for transmitting a signal from a signal source to a receiver, said apparatus comprising:
   a plurality of unbalanced communication paths each having a feedback line to transmit said signals, said feedback line being connected to a common voltage level; and
   phase reversing means coupled to one of said unbalanced communication paths for producing first and second induced currents in a first of said unbalanced communication paths by the influence of a signal transmitted through a second of said unbalanced communication paths, wherein said induced currents are 180° out of phase with respect to each other, wherein said phase reversing means is connected in every unbalanced communication path.

6. A signal communication apparatus for transmitting a signal from a signal source to a receiver, said apparatus comprising:
   a plurality of unbalanced communication paths each having a feedback line to transmit said signals, said feedback line being connected to a common voltage level; and
   phase reversing means coupled to one of said unbalanced communication paths for producing first and second induced currents in a first of said unbalanced communication paths by the influence of a signal transmitted through a second of said unbalanced communication paths, wherein said induced currents are 180° out of phase with respect to each other, further including cross-point switches arranged in each unbalanced communication path for selectively connecting said signal source to said receiver.

* * * * *